United States Patent [19]

Cornford

[11] 4,025,133
[45] May 24, 1977

[54] REVERSIBLE PIVOTED BEARING

[75] Inventor: Arthur Selwyn Cornford, Clarkson, Canada

[73] Assignee: Aerofall Mills Limited, Mississauga, Canada

[22] Filed: May 24, 1976

[21] Appl. No.: 689,197

[52] U.S. Cl. .................................. 308/73; 308/122
[51] Int. Cl.² ......................................... F16C 17/06
[58] Field of Search ............ 308/73, 122, 3 R, 3 A, 308/3.5

[56] References Cited

UNITED STATES PATENTS

| 3,703,322 | 11/1972 | Gustafsson | 308/122 |
| 3,887,245 | 6/1975 | Rouch | 308/73 X |
| 3,917,365 | 11/1975 | Jenness | 308/73 |

Primary Examiner—Joseph F. Peters, Jr.
Assistant Examiner—Gene A. Church

[57] ABSTRACT

A bearing assembly comprises a plurality of bearing shoes positioned to engage a slide member or a journal in supporting relation thereto, each bearing shoe having a bearing face conforming to the surface of the member to be supported. Each shoe is a composite member comprising a main shoe portion and a pair of auxiliary end shoe portions which are articulately connected to the main shoe portion and displaceable therefrom to disengage the member being supported. Each bearing shoe is symmetrically mounted with respect to a pivot, and the auxiliary shoe portions are selectively displaceable between operative and inoperative positions so as to establish an effective bearing face positioned to engage the member being supported, which bearing face is asymmetrically disposed in relation to the pivotal mounting. The geometry of the bearing assembly is thus reversible.

9 Claims, 5 Drawing Figures

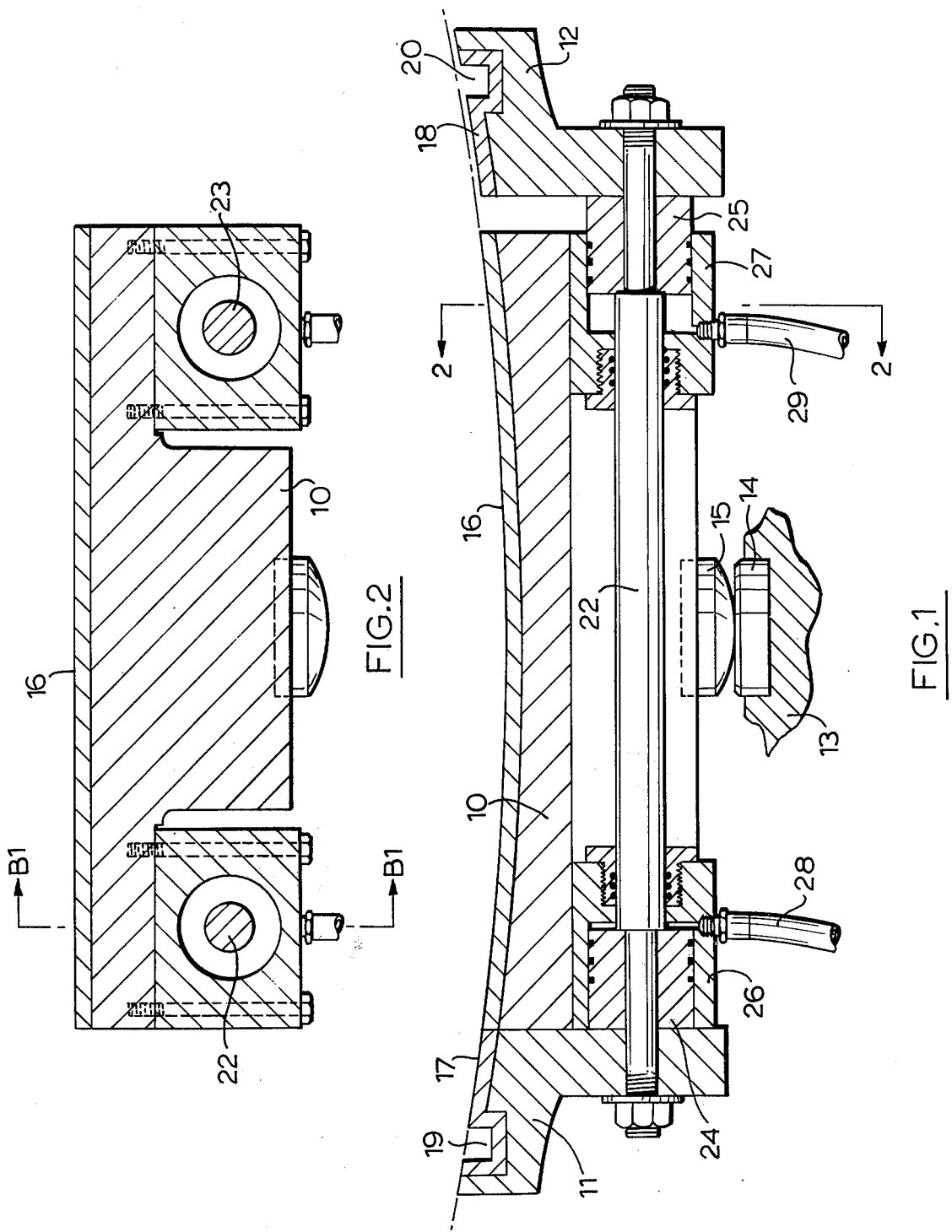

REVERSIBLE PIVOTED BEARING

BACKGROUND OF THE INVENTION

This invention relates to bearings of the type comprising a plurality of pivoted bearing shoes positioned to engage a slide member in supporting relation thereto, wherein oil is applied to the bearing faces of the shoes to establish a hydrodynamic wedge of oil created by the motion of the slide member. The invention is applicable to trunnion bearings for cylindrical journals and also to slider bearings in which the slide member has a flat bearing face.

The performance of bearings of this type depends upon a number of geometric factors, one of the most important factors being the disposition of the bearing face of each shoe in relation to its respective pivot. For optimum performance the pivot must be located slightly off centre towards the trailing edge of the shoe. It follows that the performance of such a bearing will be optimized for one direction of travel only of the slide member, i.e. journal or runner; if the geometry is optimized for one direction of travel, the performance of the bearing will be inferior when the direction is reversed, as the pivot will then be offset towards the leading edge of the shoe. When bidirectional motion is required it is usual to compromise by mounting the bearing shoe symmetrically with respect to its pivot. However, with this arrangement the bearing performance cannot be optimized for either direction of travel, and indeed the performance is unpredictable.

In order to meet this problem it has been proposed to provide a journal bearing shoe arrangement in which the effective pivot location of the bearing shoe can be changed by changing the pressure profile of the lubricating oil film at the interface between the bearing pad and the journal which it supports. Such an arrangement is described in U.S. Pat. No. 3,887,245 of Keith E. Rouch, dated June 3, 1975. A very much more complex bearing shoe arrangement intended to solve this problem is also described in U.S. Pat. No. 3,917,365 of Raymond C. Jenness, dated Nov. 4, 1975.

SUMMARY OF THE INVENTION

It is an object of the present invention to provide a reversible bearing whose performance can be optimized for each direction of motion of the slide member. This is achieved by constructing each bearing shoe as a composite member comprising a main shoe portion and a pair of auxiliary shoe portions which are articulated to the main shoe portion at its leading and trailing ends. Each auxiliary shoe portion supports a respective end portion of the bearing face, and is selectively displaceable in relation to the main shoe portion between an operative position in which the end portion of the bearing face is positioned to engage the slide member and an inoperative position in which it is disengaged from the slide member. The bearing shoe is symmetrically mounted with respect to its pivot; therefore, when only one auxiliary shoe portion is in the operative position, the shoe provides an effective bearing face which is asymmetrical relative to the pivot. In operation, it is arranged that the auxiliary shoe portion at the trailing end of the shoe, having regard to the direction of travel, will be displaced from the operative position.

BRIEF DESCRIPTION OF THE DRAWINGS

Several embodiments of the invention will now be described, by way of example, with reference to the accompanying drawings, in which:

FIG. 1 is a longitudinal sectional view of a bearing shoe, illustrating one shoe construction which may be used in the bearing assembly of the invention;

FIG. 2 is a section on line 2—2 in FIG. 1;

DESCRIPTION OF THE PREFERRED EMBODIMENTS

Figure 3:
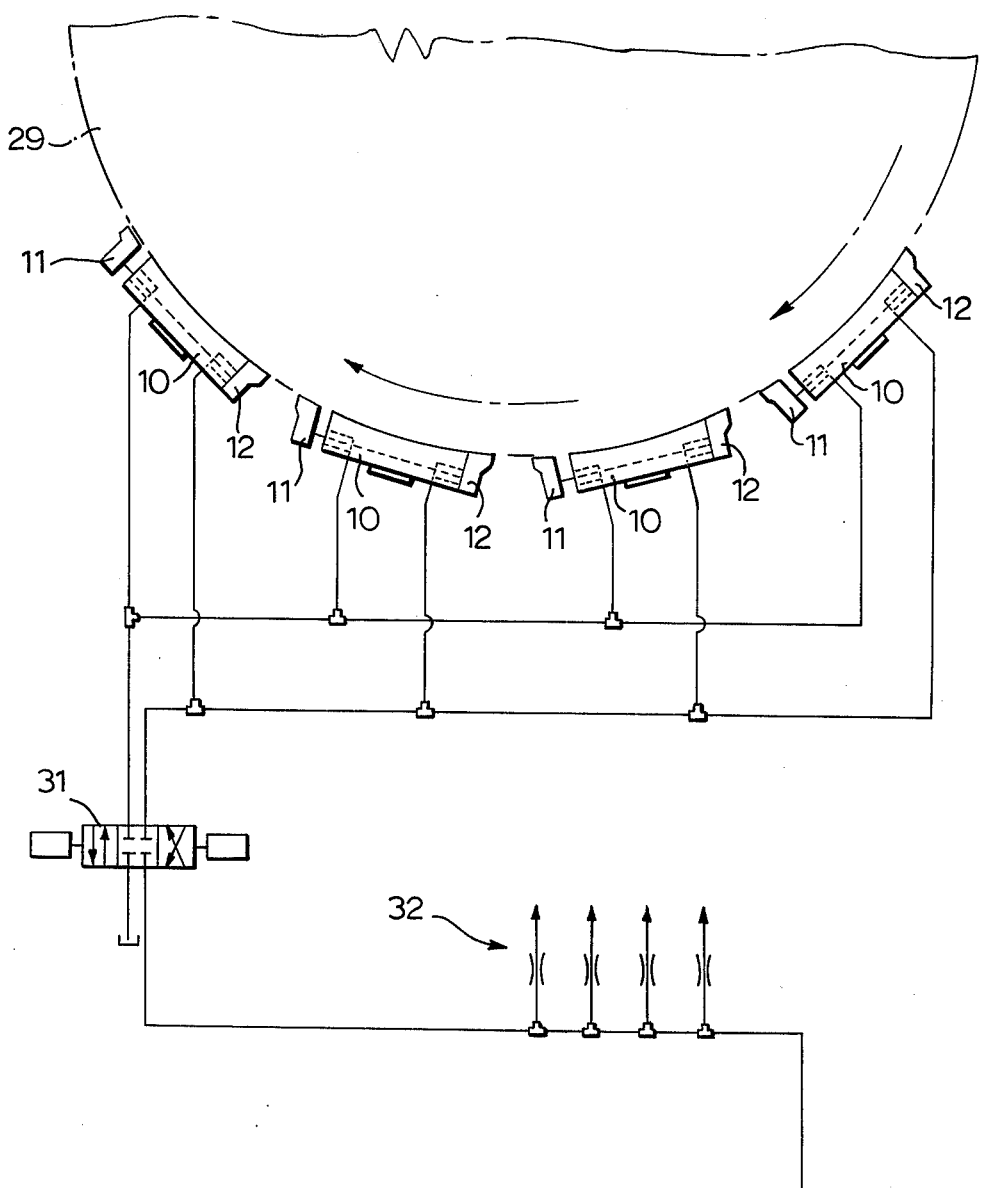
FIG. 3 is a diagrammatic representation of a bearing assembly incorporating bearing shoes of the type shown in FIGS. 1 and 2.

Referring to FIGS. 1 and 2, the bearing shoe illustrated is adapted for use in a bearing assembly for supporting a rotating journal having a cylindrical surface. The bearing shoe is a composite member comprising a main shoe member 10 and a pair of auxiliary shoe members 11, 12 which are articulated to the main shoe member at its leading and trailing ends. The shoe is mounted on a support structure 13 which provides a universal pivotal mounting formed by a pivot pad 14 and a part-spherical pivot member 15 which is connected to the shoe structure. The bearing shoe is mounted symmetrically with respect to its pivot. The main shoe member 10 carries a bearing lining 16 which is shaped to conform to the cylindrical surface of the journal to be supported. Each auxiliary shoe member 11, 12 carries a lining 17, 18 which, when the shoe member is in the operative position, as in the case of member 11 shown in FIG. 1, is contiguous with the lining 16 and ends therefrom so as to constitute an end portion of the bearing face of the shoe. As illustrated in FIG. 1, each of the auxiliary shoe members 11, 12 provides an oil groove 19, 20, to which oil is fed in the conventional manner so as to apply an oil film to the bearing face of the shoe to establish a hydrodynamic wedge of oil.

The auxiliary shoe members 11, 12 carry a pair of piston rods 22, 23 which extend longitudinally. The ends of each piston rod are connected to pistons 24, 25 which can slide in cylinders 26, 27 attached at the leading and trailing ends of the main shoe member, the pistons themselves being fastened securely to the auxiliary shoe members 11, 12. Each such piston and cylinder combination constitutes a hydraulic ram to which hydraulic fluid under pressure may be supplied and from which hydraulic fluid may be discharged via a supply pipe 28 or 29. In the configuration shown in FIG. 1, pressurized fluid has been supplied to the cylinder 27, acting on the piston 25, and so displacing the auxiliary shoe members 11 and 12 longitudinally with respect to the main shoe member 10. In this configuration the member 11 is in its operative position to engage the journal, and the member 12 is in an inoperative position out of engagement with the journal. Thus, the effective bearing face is constituted by the bearing linings 16, 17, the bearing face being disposed asymmetrically with respect to the pivot 14, 15, and the lining 17 providing the leading end portion of the bearing face. The geometry can be reversed simply by supplying pressurised fluid to the cylinder 26 and draining fluid from the cylinder 27.

In the assembly show in FIG. 3, the cylindrical journal 29 is supported by four bearing shoes of the construction illustrated in FIGS. 1 and 2. The system includes a hydraulic pressure source indicated diagrammatically at 30, and circuit means including a solenoid-operated selector valve 31 for selectively and alternatively connecting the hydraulic pressure source to the hydraulic rams of the bearing shoes whereby to displace the auxiliary shoe members 11, 12 to and from their operative positions. Lubricating oil for the bearing faces of the shoes may be derived from the pressure fluid circuit via orifices 32, or alternatively may be derived in any other manner.

Figure 4:
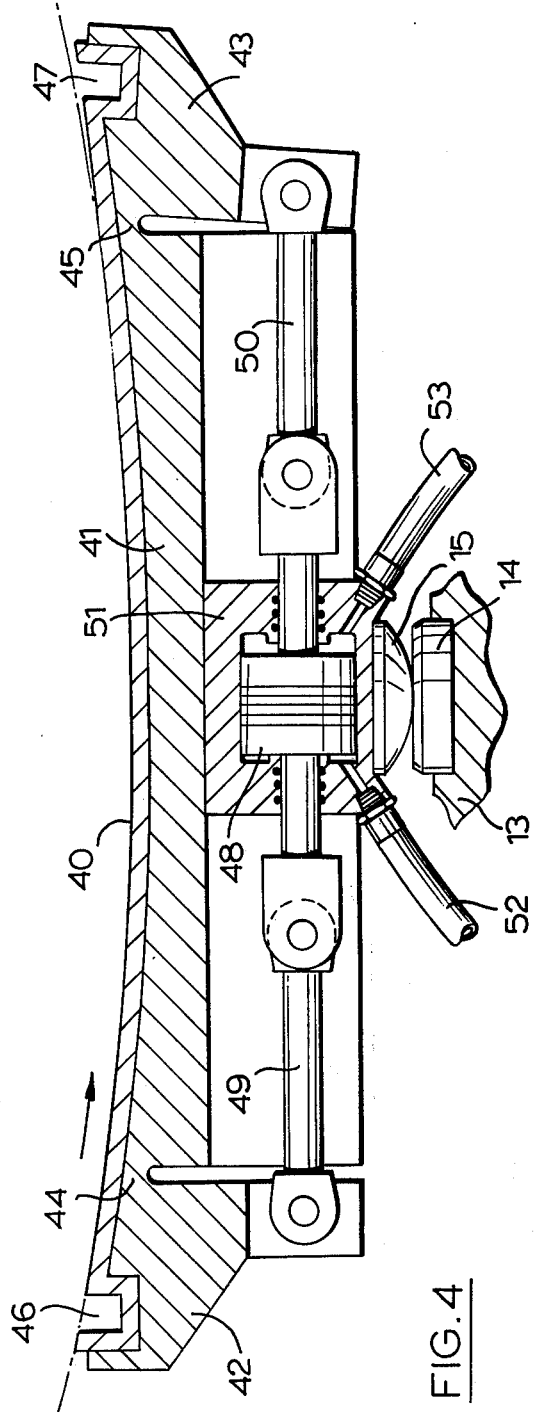
FIG. 4 is a longitudinal sectional view of an alternative bearing shoe illustrating its construction.

In the alternative bearing shoe construction shown in FIG. 4, the bearing face is provided by a unitary lining 40, and the shoe itself is a unitary structure comprising a main shoe portion 41 and auxiliary shoe portions 42, 43 connected to the main shoe portion by thin bridge pieces 44, 45 which are capable of flexure. The end portions of the bearing face are formed with transverse oil grooves, 46, 47 as in the first construction.

The auxiliary shoe portions are selectively and alternatively displaced to and from their operative positions, at which they engage the journal surface, by means of two double acting hydraulic rams, only one of which is shown in FIG. 4. Each ram comprises a double acting piston 48 connected by piston rods 49, 50 to the respective auxiliary shoe portions, and sliding in a cylinder 51 secured to the main shoe portion. The ram is operated by supplying pressurised hydraulic fluid to the cylinder 51 on one or other side of the piston via fluid supply pipes 52, 53, depending upon which of the auxiliary shoe portions is to be deflected from the operative position. As shown in FIG. 4, it is the shoe portion 43 that has been so deflected so that the effective bearing face engaging the journal is asymmetrical with respect to the pivot 14, 15, the latter thus being slightly offset towards the trailing edge of the shoe.

Figure 5:
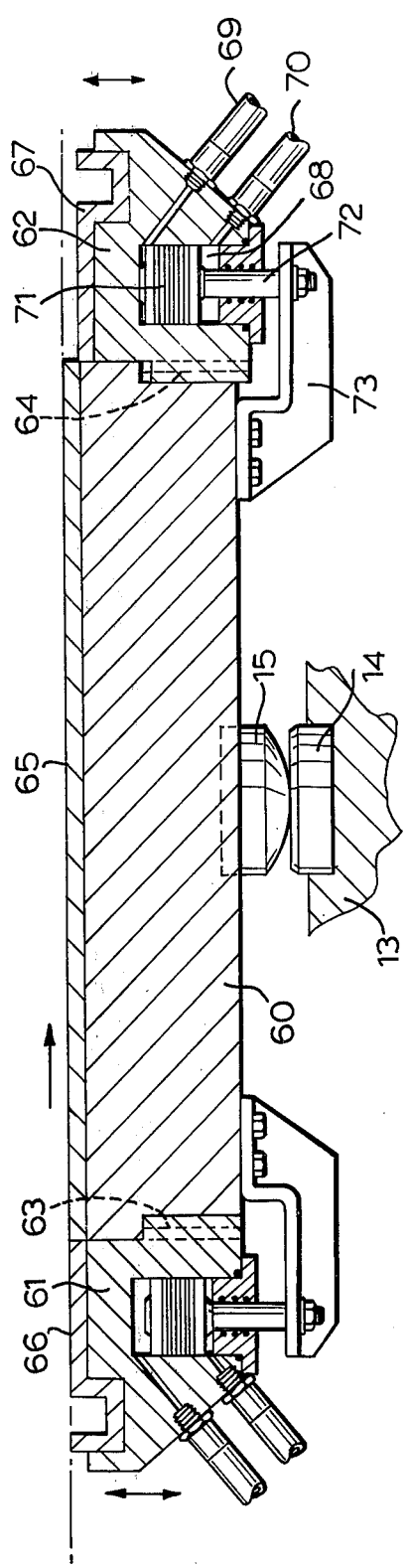
FIG. 5 is a longitudinal sectional view of yet another bearing shoe illustrating its construction.

The shoe construction illustrated in FIG. 5 is intended to be used in a bearing assembly of the type comprising a plurality of shoes adapted to engage the flat bearing surface of a slide member in supporting relation thereto, the slide member being constrained to slide linearly. The shoe comprises a main shoe member 60 and a pair of auxiliary shoe members 61, 62 which are keyed to its ends by slide-ways 63, 64 so as to be movable to and from their operative positions in a direction perpendicular to the bearing face of the shoe. The main shoe member 10 carries a bearing lining 65 which defines a flat bearing face, the end portions of the bearing face being provided by linings 66, 67 supported by the auxiliary bearing members. As in the preceding embodiments, the bearing shoe is mounted on a support structure 13 providing a universal pivot constituted by a pivot pad 14 and part spherical pivot member 15. The main shoe member 60 is symmetrically disposed with respect to the pivotal mounting. The auxiliary shoe members 61, 62 are selectively moved to and from their operative positions by hydraulic rams. Each hydraulic ram is constituted by a cylinder chamber 68 formed in the respective shoe member, to which hydraulic pressure is applied via fluid connections 69, 70, and a piston 71 connected by a piston rod 72 to a bracket member 73, the bracket member 73 extending from the main shoe member, to which it is secured. By selective operation of the rams, one or other of the auxiliary shoe members, for example the shoe member 62 as shown in FIG. 5, can be displaced from its operative position. With the other shoe member in its operative position, the composite shoe provides an effective bearing face which is asymmetrical with respect to the pivotal mounting, the latter being slightly offset towards the trailing edge of the shoe.

Although the bearing shoes illustrated in FIGS. 1 and 2, and 4 are designed particularly for supporting a journal having a cylindrical bearing surface, and the bearing shoe illustrated in FIG. 5 is designed particularly for supporting a slide member having a plane bearing surface, each of the bearing shoes can in fact be adapted to suit either application.

What I claim as my invention is:
1. A bearing assembly comprising:
a plurality of bearing shoes positioned to engage a slide member in supporting relation thereto;
support means including a plurality of pivotal mountings for the bearing shoes,
each bearing shoe providing a bearing face conforming to the shape of the slide member for engagement therewith, and being mounted symmetrically with respect to a respective one of said pivotal mountings;
oil supply means for applying oil to the bearing faces of the shoes whereby to create a hydrodynamic oil film between said bearing faces and the slide member,
each shoe comprising a main shoe portion and a pair of auxiliary shoe portions articulated thereto, each auxiliary shoe portion supporting a respective end portion of the bearing face and being displaceable from an operative position in which the respective end portion is positioned to engage the slide member to an inoperative position in which the respective end portion is disengaged from the slide member; and
means for displacing the auxiliary shoe portions selectively and alternatively from their operative positions whereby to establish an effective bearing face positioned to engage the slide member which bearing face is asymmetrically disposed in relation to the respective pivotal mounting.

2. A bearing assembly according to claim 1, wherein said means for displacing the auxiliary shoe portions of each pair comprise a pair of hydraulic rams connected respectively to said shoe portions, a source of hydraulic pressure, and fluid circuit means including a selector valve operable to connect the hydraulic rams selectively and alternatively to the hydraulic pressure source.

3. A bearing assembly according to claim 2, in which the hydraulic rams are constituted by a double acting hydraulic piston which is slidable longitudinally in a cylinder to which pressurised hydraulic fluid is supplied selectively on either side of the piston.

4. A bearing assembly according to claim 1, wherein each auxiliary shoe portion is displaceable in a direction transverse to said bearing face between said operative and inoperative positions.

5. A bearing assembly according to claim 1, wherein each auxiliary shoe portion is displaceable longitudinally between said operative and inoperative positions.

6. A bearing assembly according to claim 1, wherein said auxiliary shoe portions are connected to the main shoe portion by flexible bridging pieces, said displacement of the auxiliary shoe portions being effected by hydraulic means and in accordance with flexure of the bridging pieces.

7. A bearing assembly according to claim 1, for supporting a slide member having a plane bearing surface, wherein each bearing shoe has a plane bearing face conforming to said surface of the slide member for engagement therewith, said bearing faces of the shoes lying in a common plane.

8. A bearing assembly according to claim 1, for supporting a journal having a cylindrical bearing surface, wherein each bearing shoe has an arcuate bearing face conforming to the cylindrical surface of the journal for engagement therewith.

9. A bearing assembly according to claim 1, for supporting a journal having a cylindrical bearing surface, wherein each bearing shoe has an arcuate bearing face conforming to the cylindrical surface of the journal for engagement therewith, said auxiliary shoe portions being connected to the main shoe portion by flexible bridging pieces, said displacement of the auxiliary shoe portions being effected by hydraulic means and in accordance with flexure of the bridging pieces.

* * * * *